UNITED STATES PATENT OFFICE.

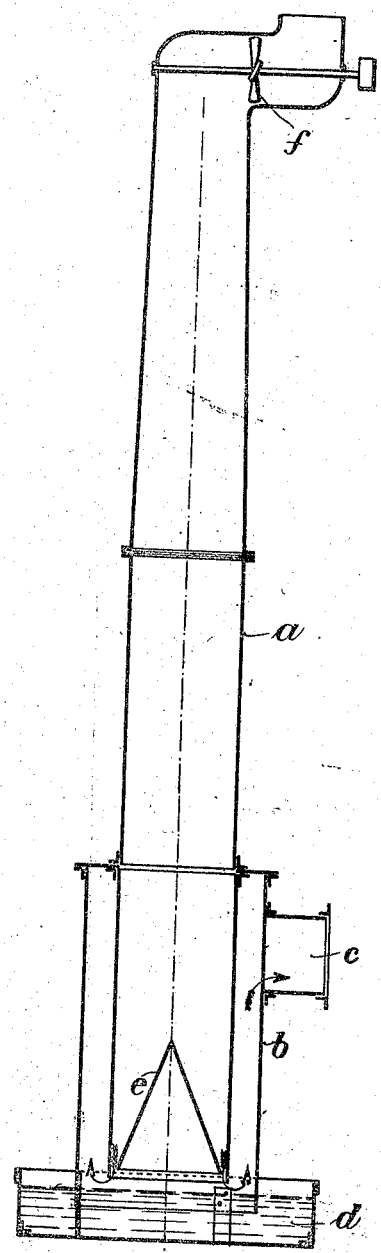

FRANÇOIS SEPULCHRE, OF LIEGE, BELGIUM.

APPARATUS FOR REMOVING SOLID AND LIQUID PARTICLES FROM GASES.

No. 899,628.  Specification of Letters Patent.  Patented Sept. 29, 1908.

Application filed September 24, 1907. Serial No. 394,400.

*To all whom it may concern:*

Be it known that I, FRANÇOIS SEPULCHRE, subject of the King of Belgium, residing at Liege, Belgium, have invented certain new and useful Improvements in Apparatus for Removing Solid and Liquid Particles from Gases; and I do hereby declare the following to be a full, clear, and exact description of the invention, such as will enable others skilled in the art to which it appertains to make and use the same.

This invention has reference to apparatus for removing from gases, any solid or liquid particles with which the same may be charged, and in which the gas is driven at a high speed against a sheet of liquid in the form of a thin film. The solid or liquid particles are also projected by the forces by which they are influenced, into a bath of water or other suitable liquid.

The annexed drawing represents one form of the apparatus in vertical section.

The upright column or pillar *a*, into which the gases to be purified are introduced at the top, leads at its lower end into a bell or casing *b*, whose upper end is closed, but which is provided with an orifice at *c*, for the escape of the purified gases. The lower end of the column *a*, is arranged at a certain distance above the plane of the liquid-bath *d*, this distance being proportionate to the speed which is imparted to the gas. This speed, which is appropriate to the nature and state of the spray and the film of liquid, may be produced by a pressure device conventionally represented at *f* such a force being imparted by it to the spray as will insure aspiration, but should be such as will insure the instant penetration of the said spray into the liquid.

In order to augment the speed of the flow of the gases and reduce to a minimum the effect of eddies which may be produced at the surface of the liquid bath *d*, a cone *e*, is arranged within the interior of the column *a*, and within the lower part thereof, in such a manner as to leave between its base and the walls of the said column, a narrow channel, through which the gases are forced onto the surface of the thin film of liquid *d*. The purified gases then rise in the bell, *b*, and escape by the orifice *c*.

It is obvious that a number or series of such apparatus as above described may be used and that the force necessary for impelling the gases therethrough may be obtained by the aid of natural pressure or by the aid of a suitable compressor or aspirator.

With this apparatus, the gases have a continuous flow which increases the output capacity of the purifier as well as serving to reduce to a minimum the exterior force which has to be applied for impelling the gases therethrough. The apparatus also has the advantages that it occupies but a moderate space and can be installed at a moderate cost.

Having fully described my invention, what I desire to claim and secure by Letters Patent is:—

1. The hereindescribed apparatus for freeing gas from liquid or solid particles contained therein, comprising a liquid receptacle, a tube providing an unobstructed gas passage and having its lower end extending into the receptacle and terminating above the level of the liquid therein, means for forcing gas to be treated through the tube at a high speed, and means at the lower end of the tube for causing the gas to pass therefrom over the liquid in the form of a thin sheet.

2. The herein described apparatus for freeing gas from liquid or solid particles contained therein, comprising a liquid receptacle, a tube having its lower end extending into the receptacle and terminating above the level of liquid therein, means for forcing the gas to be treated through the tube at a high speed, and a cone-shaped body arranged within the lower end of the tube and providing therewith a narrow annular passage, whereby the gas will be discharged from the lower end of the tube in the form of a thin sheet.

3. The herein described apparatus for freeing gas from liquid or solid particles contained therein, comprising a liquid receptacle, a tube having its lower end extending into the receptacle and terminating above the level of liquid therein, means for forcing the gas to be treated through the tube at a high speed, a cone-shaped body arranged within the lower end of the tube and providing therewith a narrow annular passage, whereby the gas will be discharged from the lower end of the tube in the form of a thin sheet, and a casing surrounding the lower portion of the tube to receive the gas passing therefrom and having an outlet for the purified gas.

In testimony whereof I have signed my name to this specification in the presence of two subscribing witnesses.

FRANÇOIS SEPULCHRE.

Witnesses:
CHARLES SEPULCHRE,
ALFONSE LERUTH.